C. W. DAKE.
MOTOR GENERATOR.
APPLICATION FILED OCT. 11, 1911.
1,101,618.
Patented June 30, 1914.
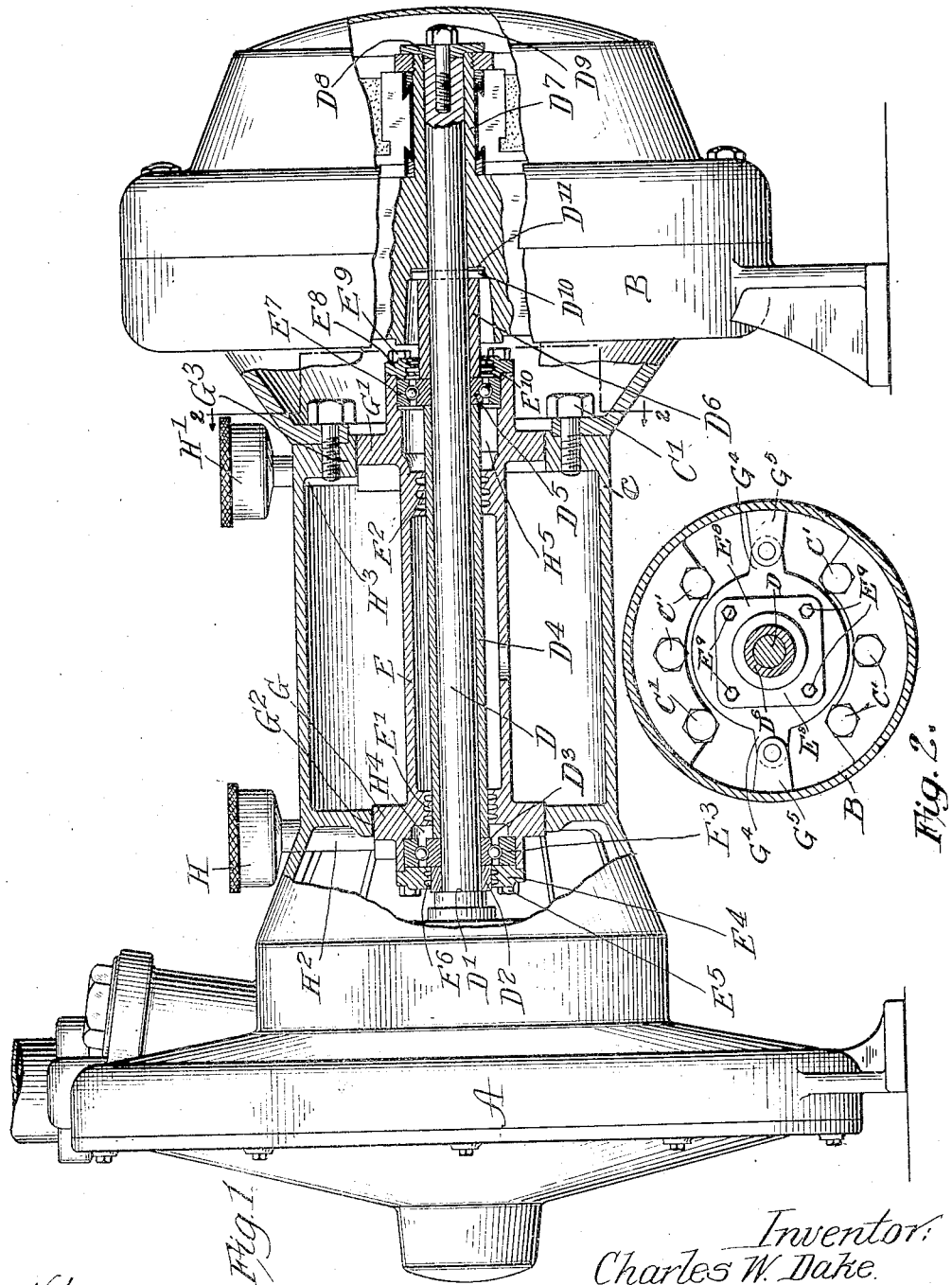
Witnesses
P. J. Gathmann
Genera Hirth
Inventor:
Charles W. Dake.
By Parker & Carter
Attorneys

UNITED STATES PATENT OFFICE.

CHARLES W. DAKE, OF CHICAGO, ILLINOIS, ASSIGNOR TO PYLE NATIONAL ELECTRIC HEADLIGHT COMPANY, OF CHICAGO, ILLINOIS, A CORPORATION OF NEW JERSEY.

MOTOR-GENERATOR.

1,101,618.  Specification of Letters Patent.  Patented June 30, 1914.

Application filed October 11, 1911.  Serial No. 654,182.

*To all whom it may concern:*

Be it known that I, CHARLES W. DAKE, a citizen of the United States, residing at Chicago, in the county of Cook and State of Illinois, have invented a certain new and useful Improvement in Motor-Generators, of which the following is a specification.

My invention relates to improvements in motor generator sets and is illustrated diagrammatically in one form in the accompanying drawings, wherein—

Figure 1 is a side elevation in part section; Fig. 2, a detail part section along the line 2—2 of Fig. 1.

Like parts are indicated by like numerals throughout the several figures.

The motor A which in this particular instance takes the form of the usual well known steam turbine and therefore needs no further discussion, is separated from the generator B by the hollow cylindrical housing or sleeve C which is attached to the generator housing by the cap screw $C^1$. The shaft D is provided at the end adjacent the motor with the shoulder $D^1$ against which abuts the collar $D^2$ which abuts on the other side the annular ball bearing $D^3$. The sleeve $D^4$ abuts at one end against the ball bearing $D^3$ and at the other end against a similar ball bearing $D^5$, which in turn abuts against the sleeve $D^6$. The generator hub $D^7$ is forced on to the shaft D against the sleeve $D^6$ tightening all the members against the shoulder $D^1$ by the cap $D^8$ and the cap screw $D^9$. The pin $D^{10}$ floats in the shaft D and in the slot $D^{11}$ in such manner that while it prevents rotation of the hub on the shaft it in nowise limits it during ordinary operation against longitudinal movement in either direction. The bearing sleeve E surrounds the shaft D and is provided adjacent either end with the spaced grease intercepting baffle plates $E^1$, $E^2$ and supports at one end the ball bearing sleeve $E^3$ held in position by the cap $E^4$ and cap screws $E^5$, the cap $E^4$ being provided with the grease intercepting baffle plates $E^6$. The sleeve E carries at its other end the ball bearing sleeve $E^7$ slidably mounted therein and limited in its movement by the cap $E^8$ held in position by the cap screws $E^9$ and provided with the grease baffle plates $E^{10}$. The sleeve E is provided adjacent either end with the collars G, $G^1$ in opposition to the shoulders $G^2$, $G^3$ in the sleeve C. It will be observed that the collar $G^1$ is of larger diameter than the collar G, thus making it easy to withdraw the sleeve E and easy also to machine both the sleeve and collars at one operation. The lugs $G^4$ projecting outwardly on either side from the collar $G^1$ are bolted to the lugs $G^5$ projecting inwardly from the sleeve C to hold the sleeve E in position therein. The grease cups H, $H^1$ are connected by means of the passages $H^2$, $H^3$ with the grease chambers $H^4$, $H^5$ in which are located the ball bearings at either end of the shaft. The grease baffle plates at either end of the bearings prevent to a great extent the waste of grease from the bearings and any grease which does exude is drained off in any suitable manner not shown.

It will be evident that while I have shown in my drawings an operative device, still many changes might be made in size, shape and arrangement of the parts without departing materially from the spirit of my invention, and I wish therefore, that my drawings be regarded as in a sense diagrammatic.

The use and operation of my device is as follows: In driving a generator by means of a steam turbine it will at once be evident that some means must be had for separating the two since the turbines which are frequently driven by steam have a tendency to heat the generator unduly if they are close together. Moreover, it is necessary that some means for steadying and supporting the shaft be had. I therefore provide an outer sleeve which connects the housings of the motor and of the generator and spaces them apart. In this sleeve I provide two inwardly projecting lugs or shoulders which are adapted to support collars on an inner bearing sleeve. This inner bearing sleeve is carried by the collars within the shoulders and held in position therein by the two lugs on either side bolted to lugs in the outer sleeves. By making the collar adjacent the motor of smaller diameter than the other, I am enabled to provide for simultaneous machining of the two bearing sleeves both on the collar on the inner sleeve and the shoulders on the outer sleeve. The two annular ball bearings on the inner shaft are spaced one from the other by a sleeve closely encircling the shaft and by tightening the cap screw in the end of the shaft I am enabled to force the ball bearings and spacing sleeves and collars firmly together against the shoulder on the motor end of the shaft. It will be observed that the ball bearing at the motor end of the shaft is rigidly held in position in the supporting sleeve but that the ball bearing collar at the other end is slidable therein, this to take care of any difference in expansion which may take place between the cast iron sleeve and steel shaft and collar. The caps at either end of the sleeve hold the bearings and shaft in position therein and limit its longitudinal motion. Grease is forced from the grease cups from the grease passages to the annular ball bearings and held therein by the baffle plates on either side thereof in opposition to the shaft.

In order to withdraw the sleeve E it must first be turned through a slight angle until the lugs $G^4$ come out of line with the lugs $G^5$ when the sleeve may be withdrawn.

Claims:

1. In a motor generator set housings for motor and generator and a connecting sleeve interposed between them and a bearing sleeve extending through and removably held in said connecting sleeve.

2. In a motor generator set housings for motor and generator and a connecting sleeve interposed between them and annular collars of varying height projecting inwardly from either end of said sleeve.

3. In a motor generator set housings for motor and generator and a connecting sleeve interposed between them and annular collars of varying height projecting inwardly from either end of said sleeve an annular collar adjacent the generator being of lesser height.

4. In a motor generator set housings for motor and generator and a connecting sleeve interposed between them and annular collars of varying height projecting inwardly from either end of said sleeve a bearing sleeve removably held within said connecting sleeve and supported by said collars.

5. In a motor generator set housings for motor and generator and a connecting sleeve interposed between them and annular collars of varying height projecting inwardly from either end of said sleeve an annular collar adjacent the generator being of lesser height a bearing sleeve removably held within said connecting sleeve and supported by said collars.

6. In a motor generator set housings for motor and generator and a connecting sleeve interposed between them and annular collars of varying height projecting inwardly from either end of said sleeve a bearing sleeve removably held within said connecting sleeve and supported by said collars said bearing sleeve having annular flanges thereon adjacent either end in opposition to said collars.

7. In a motor generator set housings for motor and generator and a connecting sleeve interposed between them and annular collars of varying height projecting inwardly from either end of said sleeve an annular collar adjacent the generator being of lesser height a bearing sleeve removably held within said connecting sleeve and supported by said collars said bearing sleeve having annular flanges thereon adjacent either end in opposition to said collars.

8. In a motor generator set housings for motor and generator and a connecting sleeve interposed between them and a bearing sleeve removably held in said connecting sleeve a shaft supported in said bearing sleeve and bearings therefor carried by said sleeve adjacent either end thereof.

9. In a motor generator set housings for motor and generator and a connecting sleeve interposed between them and annular collars of varying height projecting inwardly from either end of said sleeve a bearing sleeve removably held within said connecting sleeve and supported by said collars a shaft supported in said bearing sleeve and bearings therefor carried by said sleeve adjacent either end thereof.

10. In a motor generator set housings for motor and generator and a connecting sleeve interposed between them and annular collars of varying height projecting inwardly from either end of said sleeve an annular collar adjacent the generator being of lesser height a bearing sleeve removably held within said connecting sleeve and supported by said collars, a shaft supported in said bearing sleeve and bearings therefor carried by said sleeve adjacent either end thereof.

11. In a motor generator set comprising housings for motor and generator a sleeve interposed between them and a shaft connecting the motor and generator and supported within and by said sleeve.

12. In a motor generator set comprising housings for motor and generator a sleeve interposed between them and a removable shaft connecting the motor and generator and supported within and by said sleeve.

13. In a motor generator set housings therefor, a connecting shaft therein and bearings within said housings and supporting said connecting shaft, and means for holding said bearings in operative relation one with the other and with the shaft independent of said housings to form a self-contained unit bodily removable from the housings.

14. In a motor generator set housings for the motor and generator, a connecting sleeve interposed between them, a bearing sleeve removably held in said connecting sleeve, and removable bearings within said bearing sleeve.

15. In a motor generator set housings for the motor and generator, a connection between said housings, a sleeve contained in said connection, bearings in said sleeve, a shaft and bearings upon said shaft in opposition to the bearings in said sleeve, means carried by said shaft and rotatable with it for holding said bearings in position in opposition to the bearings in the sleeve.

16. In a motor generator set housings for the motor and generator, a connection between said housings, a sleeve contained in said connection, bearings in said sleeve, a shaft and bearings upon said shaft in opposition to the bearings in said sleeve, means carried by said shaft and rotatable with it for holding said bearings in position in opposition to the bearings in the sleeve, said sleeve being removably held in said connection.

CHARLES W. DAKE.

Witnesses:
FRANCIS W. PARKER, Jr.,
GENEVA HIRTH.